(12) United States Patent
Gupta et al.

(10) Patent No.: US 7,167,316 B1
(45) Date of Patent: Jan. 23, 2007

(54) PROJECTION LENS ASSEMBLY

(75) Inventors: Anurag Gupta, Corvallis, OR (US);
Wiatt Kettle, Corvallis, OR (US); Scott Lerner, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 11/193,948

(22) Filed: Jul. 29, 2005

(51) Int. Cl.
*G02B 3/00* (2006.01)
*G02B 13/22* (2006.01)

(52) U.S. Cl. ........................ 359/649; 359/663
(58) Field of Classification Search ........ 359/649–651, 359/663, 708, 713, 740
See application file for complete search history.

(56) References Cited

U.S. PATENT DOCUMENTS

| | | | |
|---|---|---|---|
| 5,062,692 A | * | 11/1991 | Marui et al. ................ 349/1 |
| 5,870,228 A | | 2/1999 | Kreitzer et al. |
| 5,975,703 A | | 11/1999 | Holman et al. |
| 6,046,860 A | | 4/2000 | Hirata |
| 6,317,171 B1 | | 11/2001 | Dewald |

* cited by examiner

*Primary Examiner*—Ricky Mack
*Assistant Examiner*—William Choi

(57) ABSTRACT

A projection lens assembly is provided that includes first, second, third, fourth, fifth, and sixth lenses. The second, third, fifth, and sixth lenses of the projection lens assembly form a double gauss-type lens assembly. The first lens is configured to provide telecentricity and the fourth lens in configured to correct aberrations due to variations in the third lens.

24 Claims, 4 Drawing Sheets

PROJECTION LENS ASSEMBLY

BACKGROUND

Micro-electromechanical systems (MEMS) are used in a variety of applications, including optical display systems. Such systems often include a light source that projects light rays onto a light modulator panel. In many optical display systems, the light modulator panel includes an array of MEMS devices commonly referred to as pixels. The pixels modulate light to control its color, intensity, hue, or other characteristics.

For example, some pixels include reflective plates that are selectively tilted to direct light along a desired path. More specifically, when such pixels are in an ON state, the reflective plate is tilted such that the pixels direct light incident thereon to the display optics, which focus the light onto a display surface. Similarly, when such pixels are in an OFF state, the reflective plate is oriented such that the light is directed away from the display surface. By controlling the frequency with which the light is directed from each pixel to the display surface, each pixel is able to produce an output that varies from light to dark on the display surface. By properly controlling an array of pixels, a full image may be formed.

Optical Modulators that are based on tilting mirrors may be limited in their capability to use light by the magnitude of the angle of mirror tilt. In particular, in order to maintain a high extinction ratio on the screen, it may be desirable to increase the separation of the display and non-display light. As a result, if the mirror tilt angle is θ and the area of a pixel is A, the light that can be processed by a single pixel is proportional to $A*\sin^2(\theta)$. For N pixels in an optical modulator the useable light is proportional to $N*A*\sin^2(\theta)$. If the mirror tilt angle is small or is reduced, it may be desirable to increase the area of the modulator. Typical projection assemblies are often configured to cover a modulator with a diagonal dimension of less than about 0.9 inches.

SUMMARY

A projection lens assembly is provided that includes first, second, third, fourth, fifth, and sixth lenses. The second, third, fifth, and sixth lenses of the projection lens assembly form a double gauss-like lens assembly. The first lens is configured to provide telecentricity and the fourth lens is configured to correct aberrations due to variations in the third lens.

BRIEF DESCRIPTION OF THE DRAWINGS

The accompanying drawings illustrate various embodiments of the present apparatus and methods and are a part of the specification. The illustrated embodiments are merely examples of the present apparatus and methods and do not limit the scope of the disclosure.

Throughout the drawings, identical reference numbers designate similar, but not necessarily identical, elements.

DETAILED DESCRIPTION

Projection lens assemblies and projection assemblies are provided herein for use in display systems. According to several exemplary embodiments discussed below, the projection lenses and projection assemblies provide optical correction over a relatively large field, improve light transfer, and may improve the black/white contrast ratio of displayed images. For example, according to one exemplary embodiment, the projection lens includes a double gauss-type lens assembly, a lens for providing telecentricity, and a lens for correcting aberrations due to variations in the shape and/or size of other lenses. Further, according to one exemplary embodiment, a projection assembly that makes use of a projection lens assembly includes a relatively large light modulator panel. For example, the light modulator panel may have a diagonal dimension of greater than about 25 mm, such as a diagonal dimension of approximately 45.7 mm. A large area modulator may allow for a relatively larger number of pixels. Relatively more pixels may in turn provide for greater brightness and increased resolution.

In the following description, for purposes of explanation, numerous specific details are set forth in order to provide a thorough understanding of the present method and apparatus. It will be apparent, however, to one skilled in the art, that the present method and apparatus may be practiced without these specific details. Reference in the specification to "one embodiment" or "an embodiment" means that a particular feature, structure, or characteristic described in connection with the embodiment is included in at least one embodiment. The appearance of the phrase "in one embodiment" in various places in the specification are not necessarily all referring to the same embodiment.

Display Systems

Figure 1:
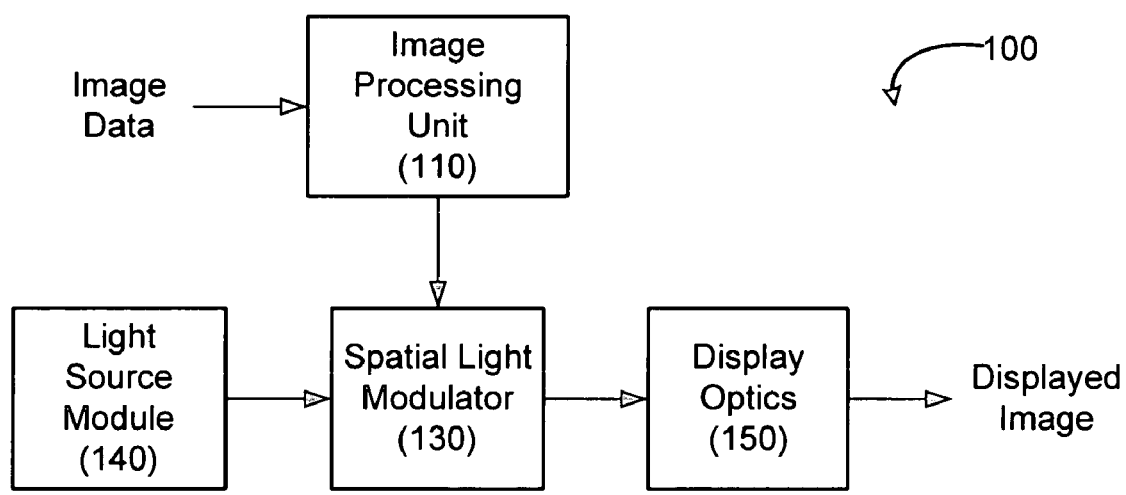
FIG. 1 illustrates a display system according to one exemplary embodiment.

FIG. 1 illustrates an exemplary display system (100). The components of FIG. 1 are exemplary only and may be modified or changed as best serves a particular application. As shown in FIG. 1, image data is input into an image processing unit (110). The image data defines an image that is to be displayed by the display system (100). While one image is illustrated and described as being processed by the image processing unit (110), it will be understood by one skilled in the art that a plurality or series of images may be processed by the image processing unit (110).

The image processing unit (110) performs various functions including controlling the illumination of a light source module (140) and controlling a light modulator panel (130). The light source module (140) generates light and directs the light toward the light modulator panel (130).

The light modulator panel, or spatial light modulator, (130) includes one or more arrays of light modulator devices. The light modulator devices may be in the form of micro-electro mechanical (MEMS) devices or pixels, which are configured to selectively reflect light incident thereon toward a display, as discussed below. According to one exemplary embodiment, the light modulator panel (130) may be relatively large. For example, the light modulator panel (130) may have a generally rectangular shape with a diagonal dimension of greater than about 25 mm, such as a diagonal dimension of about 45.7 mm.

A portion of the light directed to the light modulator panel (130) is modulated by the pixel arrays. This modulated light is then directed to the display optics (150). The display optics (150), which include a projection lens assembly, focuses the modulated light onto a display surface to form an image. The non-modulated portion of the light directed to the light modulator panel (130) is reflected away from the display optics (150), as will be discussed in more detail below.

The display optics (150), according to the present exemplary embodiment, include several refractive lenses placed in a series. The configuration of the display optics (150) and light modulator panel (130) may provide for error correction over a relatively large field, improved contrast ratio, keystone mitigation, greater light throughput, and greater brightness.

Projection Assembly

Figure 2:
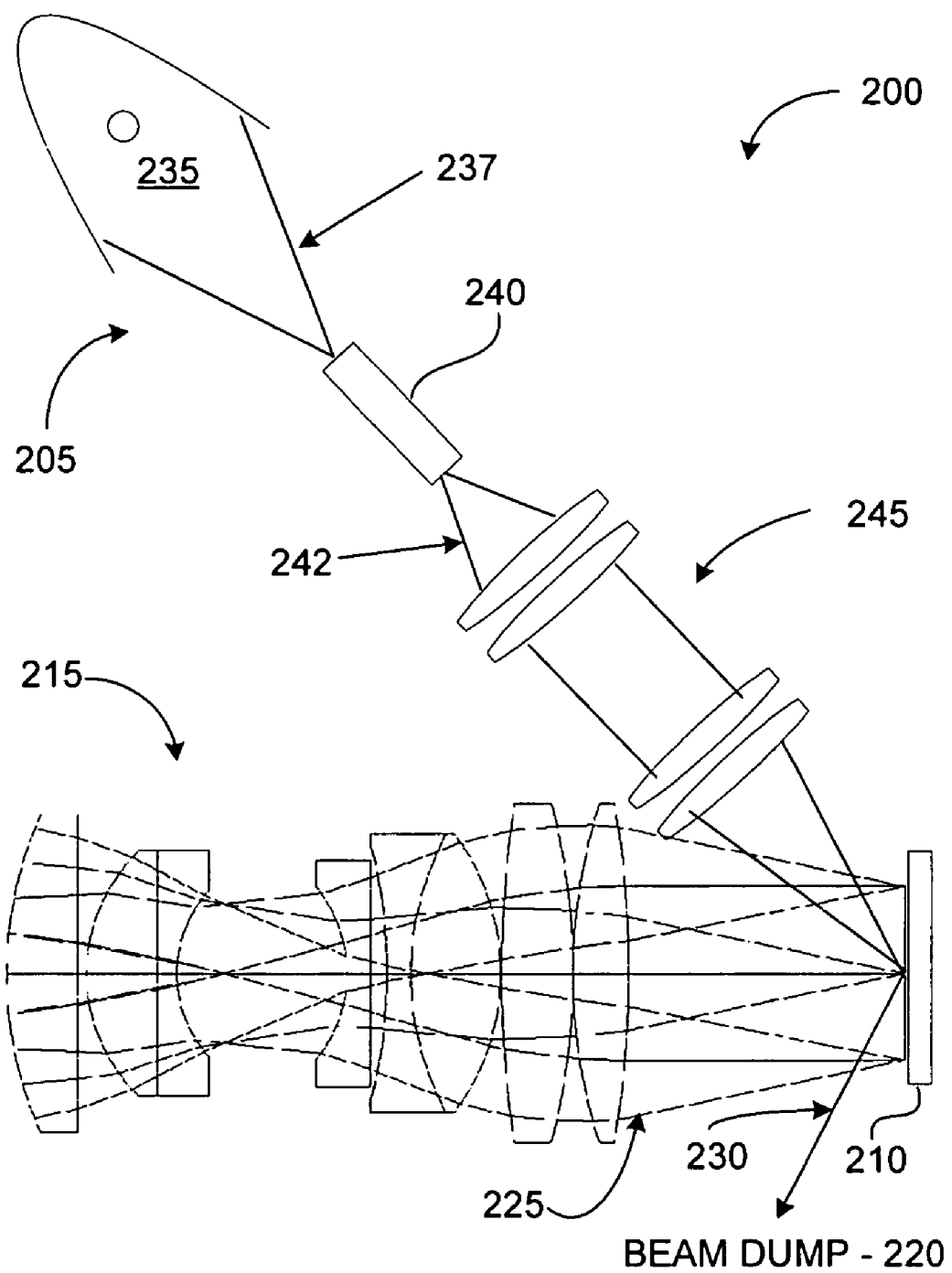
FIG. 2 illustrates a projection assembly according to one exemplary embodiment.

FIG. 2 illustrates a projection assembly (200) that generally includes a light source module (205), a light modulator panel (210), a projection lens assembly (215) and a beam dump (220). As will be discussed in more detail below, the light source module (205) generates light and directs the light to the light modulator panel (210). The light modulator panel (210) modulates the light to form display light (225) and non-display light (230). The display light (225) is directed through to the projection lens assembly (215), which directs the display light to a display surface. The non-display light (230) is directed to the beam dump (220), which absorbs a substantial portion of the non-display light (230), thereby minimizing the non-display light (230) that reaches the projection lens assembly (215). The beam dump (220) may include a light absorbing surface configured to absorb a substantial portion of light directed thereto. Thus, the projection lens assembly (215) may provide for a relatively large back plan focal distance while allowing use of a relatively large light modulator panel.

The light source module (205) according to the present exemplary embodiment may include a lamp assembly (235) that generates concentrated light (237). Concentrated light (237) generated by the lamp assembly (235) is directed to an integrator rod or device (240). The integrator device (240) spatially integrates the concentrated light (237) so light exiting the integrator rod (240) has a uniform spatial profile at its exit face. The spatially integrated light (242) exiting the integrator rod (240) is directed to an illumination relay (245). The illumination relay directs the spatially integrated light (242) from the exit face of the integrator device (240) to the light modulator panel (210).

The light modulator panel (210) according to the present exemplary embodiment is a reflective-type modulator panel (210). Accordingly, the light modulator panel (210) includes a plurality of individual pixels. Each individual pixel includes a reflective plate that is selectively tilted. Similarly, according to the present exemplary embodiment, the reflective plate of a pixel may be tilted to direct light incident thereon toward the projection lens assembly (215). The range of mirror tilt may be between about 0 and 30 degrees, such as an angle of about 24 degrees.

By controlling the frequency with which each pixel of the light modulator panel (210) is activated, the light modulator panel (210) is able to produce an output that varies between light and dark. Thus, the output, which may be referred to as display light, is able to form an image having portions that vary from light to dark. Further, as previously discussed, the spatially integrated light (237) may be sequentially color varying light. Accordingly, by controlling the output of the light modulator panel (210) when a color of light is directed thereon, the light modulator panel (210) may form sequential sub-images. When the sub-images are formed with sufficient frequency, the sub-images will be perceived as a single full-color image. Display light (225) is directed from the light modulator panel (210) toward the projection lens assembly (215). The projection lens assembly (215) is shown in more detail in FIG. 3.

Figure 3:
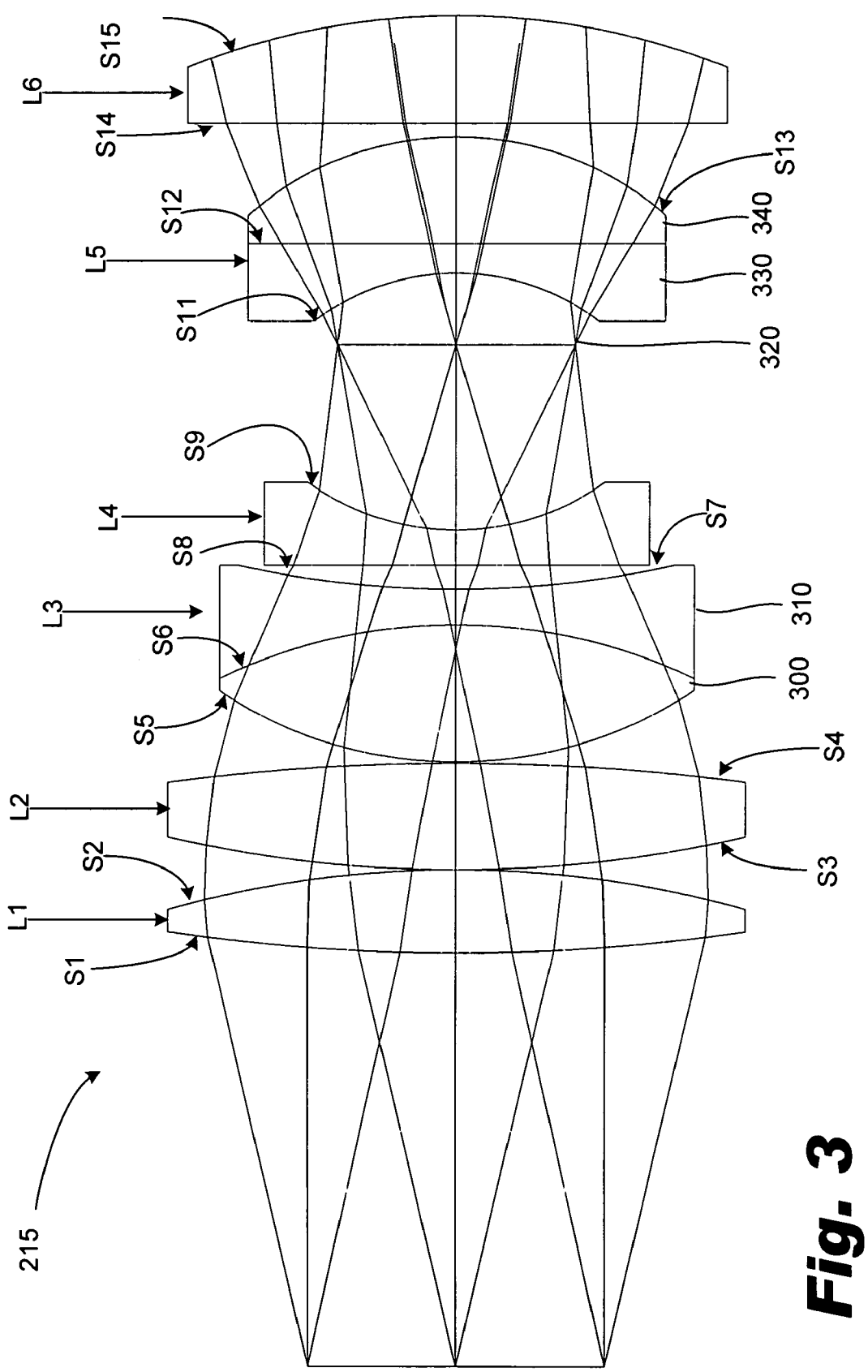
FIG. 3 illustrates a projection lens assembly according to one exemplary embodiment.

As shown in FIG. 3, the projection lens assembly (215) according to the present exemplary embodiment includes a first lens (L1), a second lens (L2), a third lens (L3), a fourth lens (L4), a fifth lens (L5), and a sixth lens (L6). The second lens (L2), third lens (L3), fifth lens (L5), and sixth lens (L6) form a double gauss-type objective, such that the exit pupil of the projection lens assembly (200; FIG. 2) is at infinity. The characteristics of the projection lens assembly (215) of the present exemplary embodiment are summarized below in Table 1 and are discussed in more detail thereafter.

TABLE 1

| Surface Type | Radius | Thickness | Glass | Diameter | Conic |
|---|---|---|---|---|---|
| OBJ Standard | Infinity | 60 | | 36 | 0 |
| S1 Standard | Infinity | 10 | SK2 | 64 | 0 |
| S2 Standard | −121.2836 | 0.25 | | 64 | 0 |
| S3 Standard | 75.6934 | 14 | SK2 | 64 | 0 |
| S4 Standard | −164.9777 | 3.977766 | | 64 | 0 |
| S5 Standard | 58.95788 | 20 | SK16 | 60 | 0 |
| S6 Standard | −70 | 6 | F5 | 60 | 0 |
| S7 Standard | Infinity | 1.476555 | | 60 | 0 |
| S8 Standard | −98.60118 | 6 | F5 | 34 | 0 |
| S9 Standard | 28.36748 | 15.22426 | | 26 | 0 |
| Stop (320) Standard | Infinity | 7.30048 | | 18.94456 | 0 |
| 11 Standard | −32.9168 | 5 | F5 | 26 | 0 |
| 12 Standard | 57.20562 | 14 | SK16 | 44 | 0 |
| 13 Standard | −41.01799 | 60.60821 | | 44 | 0 |
| 14 Standard | −714.2592 | 15 | SK2 | 92 | 0 |
| 15 Evenashp | −107.3158 | 1000 | | 92 | 0 |

The first lens (L1) according to one exemplary embodiment is a spherical biconvex lens. The first lens (L1) may be made of any suitable material including, without limitation, SK2 or other types of glass. According to one exemplary embodiment, the first lens (L1) has a diameter of about 90 mm with a thickness of about a thickness of about 14 mm. A first surface (S1) of the first lens (L1) has a spherical interface radius of about 287 mm. Further, according to one exemplary embodiment, the second surface (S2) of the first lens (L1) has a spherical interface radius of about −154 mm. The first lens (L1) may allow the projection lens assembly (215; FIG. 2) to provide telecentricity.

In particular, the first lens (L1) is shaped to collimate the chief rays for all points across the light modulator panel such that the entrance pupil of the system is located at infinity. By collimating the chief rays across the light modulator panel (210; FIG. 2), the first lens (L1) may help improve uniformity across the screen and improve light transfer efficiency.

The second lens (L2), according to one exemplary embodiment, is also a spherical bi-convex lens. The second lens (L2) has a diameter of 90 mm and thickness of about 18 mm. The second lens (L2) is separated from the first lens (L1) by about 1 micron. The second lens (L2) may be made of any suitable material including, without limitation, SK2 or other types of glass. The first surface (S3) of the second lens (L2) has a spherical interface radius in the range of about 186 mm. The second surface (S4) of the second lens (L2) may have a spherical interface radius about 312 mm.

The third lens (L3) according to one exemplary embodiment is a compound lens with a diameter of about 74 mm that includes a bi-convex lens (300) and a biconcave lens (310). The biconvex lens (300) may be made of any suitable material including, without limitation, SK16 or other types of glass. According to one exemplary embodiment, the first biconvex lens is approximately 23 mm thick. The first surface (S5) of the biconvex lens (300) has a spherical interface radius of about 63 mm. The first surface (S5) of the bi-convex lens (300) may be placed 0.25 mm away from the second surface of the second lens (L2). Further, according to one exemplary embodiment, the second surface (S6) of the bi-convex lens (300) has a spherical interface radius of about −81 mm.

The biconcave lens (310) is approximately 16 mm thick with a diameter of about 74 mm. The biconcave lens (310) may be made of any suitable material including, without limitation, F5 or other types of glass. According to one exemplary embodiment the first surface of the biconcave lens (310) corresponds closely in size and shape with the second surface (S6) of the bi-convex lens (300). According to one exemplary embodiment, the second surface (S7) of the bi-concave lens (310) has a spherical interface radius of about 146 mm.

The fourth lens (L4), according to one exemplary embodiment, is also a spherical planar concave lens. The fourth lens (L4) has a diameter of about 60 mm and a thickness of 6 mm. The fourth lens (L4) may be made of any suitable material including, without limitation, F5 or other types of glass. According to such an embodiment, the first surface (S8) of the fourth lens (L4) is generally flat, such that it has a spherical interface radius equivalent to an infinite radius. The first surface (S8) of the fourth lens (L4) may be placed approximately 4 mm away from the second surface (S9) of the bi-concave lens (310). The second surface (S9) of the fourth lens (L4) may have a spherical interface radius in the range of about 37 mm. The fourth lens (L4) may allow the third lens (L3) to have looser tolerances. In particular, the fourth lens (L4) may be used to control field curvature.

A system stop (320) is located approximately 31.4 mm from the last surface of the fourth lens (L4). The system stop (320) has a diameter of approximately 37 mm. The system stop (320) defines the smallest bundle of rays inside any optical system. The chief ray passes through the center of the stop by definition and the marginal ray passes through the edge of the stop by definition.

The fifth lens (L5) according to one exemplary embodiment is a compound lens including a planar concave lens (330) and second planar convex lens (340). The fifth lens (L5) is located about 12 mm away from the system stop (320) and is about 65 mm in diameter. The planar concave lens (330) according to the present exemplary embodiment is made up of F5 glass and has a first surface (S11) with a radius of curvature for the concave surface to be −34 mm and a second surface (S12) that is generally flat. The first surface of the planar convex lens (340) corresponding closely in size and shape to the second surface (S11) of the planar concave lens (330). The planar convex lens (340) according to the present exemplary embodiment is made up of SK16 or similar material and has a second surface (S13) with a radius of curvature for the convex surface of about −46 mm.

Referring again to FIG. 3, the sixth lens (L6), according to one exemplary embodiment, is a spherical planar convex lens. The sixth lens (L6) may be formed of any suitable material, such as SK2 or other suitable glass. The sixth lens (L6) has a diameter of 84 mm and a thickness of 18 mm. In addition, the first surface (S14) of the sixth lens (L6) may be generally flat. The second surface (S15) of the sixth lens (L6) may have a spherical interface radius of about −106.8.

The first lens (L1) is located approximately 70 mm away from the modulator, which may provide sufficient distance to allow non-display light to be reflected to the beam dump and thus not enter the projection lens assembly while the sixth lens (L6) is located approximately 1000 mm from the display screen for applications such as rear projection television. The projection lens assembly (215) is configured to cover up to 46 mm diameter of an optical modulator. Thus, such a configuration may be used with a relatively large optical modulator. In the case of a modulator that makes use of tilting mirrors, the use of a relatively large modulator may reduce the mirror tilt angles of each mirror while maintaining a constant throughput.

Method of Modulating Light

Figure 4:
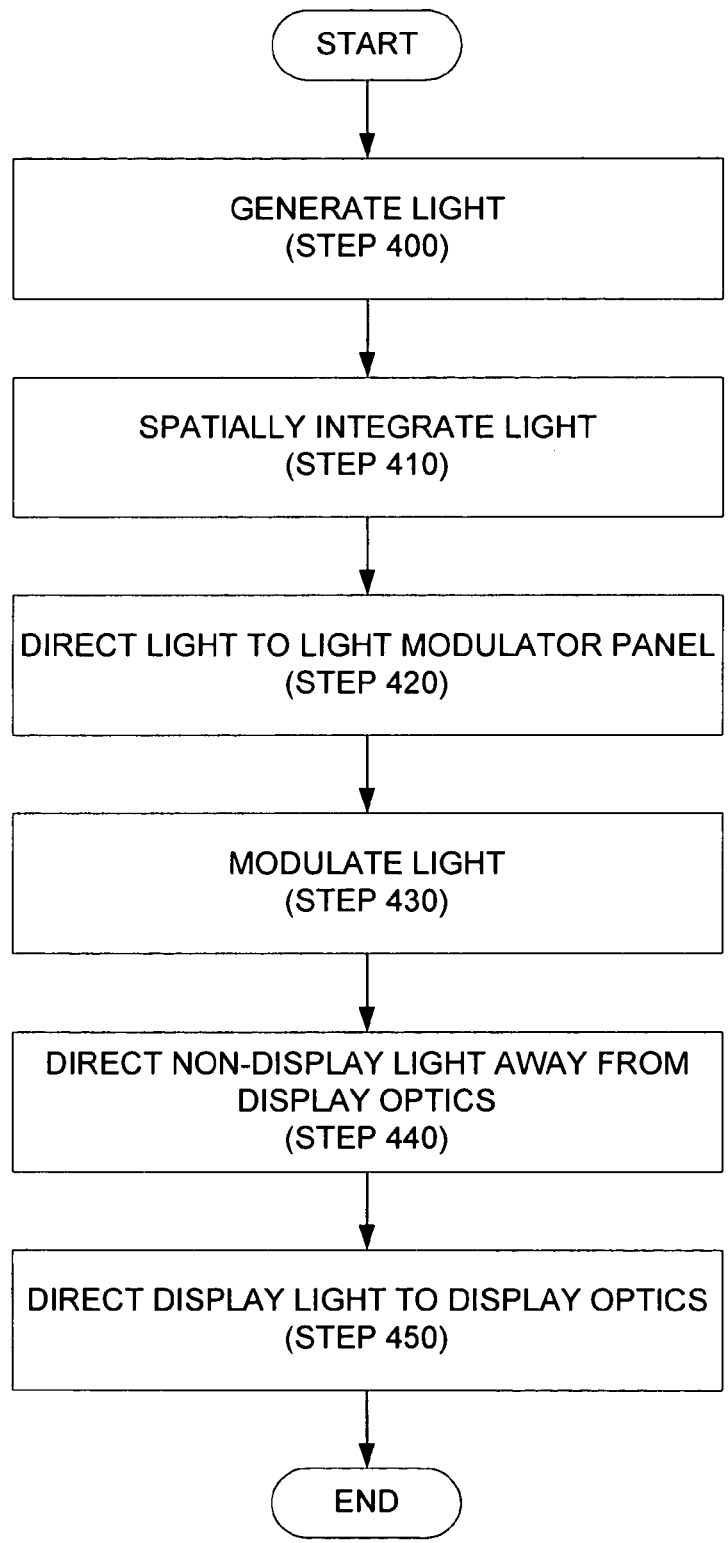
FIG. 4 is a flowchart illustrating a method of modulating light according to one exemplary embodiment.

FIG. 4 illustrates an exemplary method of modulating light. The method begins by generating light (step 400). The light may be sequentially varying light according to one exemplary embodiment. The light is then spatially integrated (step 410) and directed to a light modulator panel (step 420). The light directed to the light modulator panel may be directed to the light modulator panel at an angle. For example, according to one exemplary embodiment, the light directed to the light modulator panel may have an angle of incidence relative to the entire modulator panel of about 24 degrees.

The light modulator panel may be of a relatively large size, such as a rectilinear light modulator panel with a diagonal dimension greater than about 0.9 inches, such as a light modulator panel with a diagonal dimension of about 1.8 inches. The light modulator panel modulates the light (step 430). According to one exemplary method, the light modulator panel may include an array of individual pixels. Each pixel may further include a reflective plate that is selectively tilted. According to the present method, when a pixel is ON, light incident thereon is directed toward display optics. Similarly, according to the present method, when a pixel is OFF, light incident thereon is directed away from the display optics.

The light directed toward the display optics may be referred to as display light, and the light directed away from the display optics may be referred to as non-display light. The non-display light is directed away from the display optics (step 440) while the display light is directed to display optics, such as a projection lens assembly (step 450), which projects the light onto a viewing surface.

In conclusion, projection lens assemblies and projection assemblies are provided herein for use in display systems. According to several exemplary embodiments, the projection lenses and projection assemblies provide optical correction over a relatively large field, and may improve the black/white contrast ratio of displayed images. For example, according to one exemplary embodiment, the projection lens includes double gauss-type lens assembly, a lens for providing telecentricity, and a lens for correcting aberrations due to variations in the shape and/or size of other lenses. Further, according to one exemplary embodiment, the projection assembly includes a relatively large light modulator panel, such as a light modulator panel with a diagonal dimension of greater than about 0.9 inch, such as a diagonal dimension of approximately 1.8 inches. A large area modulator may provide for greater light throughput, greater brightness, and/or more pixels, which may provide for increased image quality of a displayed image.

The preceding description has been presented only to illustrate and describe the present method and apparatus. It is not intended to be exhaustive or to limit the disclosure to any precise form disclosed. Many modifications and variations are possible in light of the above teaching. It is intended that the scope of the disclosure be defined by the following claims.

What is claimed is:

1. A projection lens assembly, comprising:
   first, second, third, fourth, fifth, and sixth lenses wherein said second, third, fifth, and sixth lenses form a double gauss lens assembly, said first lens is configured to provide telecentricity;
   wherein either or both an entrance pupil and exit pupil of said assembly is located at infinity.

2. The assembly of claim 1, wherein said fourth lens is configured to correct field curvature of said third lens.

3. The assembly of claim 1, wherein an entrance pupil is located at infinity.

4. The assembly of claim 3, wherein said second surface of said first lens is separated from said first surface of said second lens by about one micron, said second surface of said second lens is separated from said first surface of said biconvex lens by about 0.25 mm, said second surface of said biconcave lens is separated from said first surface of said fourth lens by about 4 mm, and said system stop is located approximately 31.4 millimeters from said second surface of said fourth lens and approximately 12 mm from said first surface of said first surface of said planar concave lens.

5. The assembly of claim 4, wherein said first lens comprises SK2, said second lens comprises SK2, said biconvex lens comprises SK16, said biconcave lens comprises F5, said fourth lens comprises F5, said planar concave lens comprises F5, said planar convex lens comprises SK16, and said sixth lens comprises SK2.

6. The assembly of claim 1, wherein an exit pupil is located at infinity.

7. The assembly of claim 1, wherein said first lens is a spherical bi-convex lens with a diameter of about 90 mm, a first surface with a spherical interface radius of about 287 mm with a thickness of about 14 mm and a second surface with a spherical interface radius of about –154 mm.

8. The assembly of claim 1, wherein said fourth lens is a spherical planar concave lens with a diameter of about 60 mm, a thickness of 6 mm a generally flat first surface and a second surface with a spherical interface radius in the range of about 37 mm, and further comprising a system stop located approximately 31.4 mm from said second surface of said fourth lens, said system stop having a diameter of approximately 37 mm.

9. The assembly of claim 8, wherein said second lens has a diameter of 90 mm and said first surface with a spherical interface radius of about 186 mm with a thickness of about 18 mm and said second surface with a spherical interface radius about 312 mm; said third lens includes a compound lens of diameter of about 74 mm that includes a bi-convex lens with a thickness of about 23 mm having a first surface with a spherical interface radius of about 63 mm and a second surface with a spherical interface radius of about –81 mm and a biconcave lens having a thickness of about 16 mm with said first surface corresponding in size and shape to said second surface of said biconvex lens and a second surface of said biconcave lens having a spherical interface radius of about 146 mm, said fifth lens about 65 mm in diameter and including a compound lens having a planar concave lens having a first surface with a radius of curvature of about –34 mm and a second surface that is generally flat and a second planar convex lens having a generally flat surface and a second surface with a diameter of about 65 mm; said sixth lens being a spherical planar convex lens with a diameter of 84 mm and a thickness of 18 mm and having a generally flat first surface and a second surface with a spherical interface radius of about –106.8 mm.

10. The assembly of claim 1, wherein said first lens comprises a spherical biconvex lens.

11. The assembly of claim 1, wherein said second lens comprises a spherical biconvex lens.

12. The assembly of claim 1, wherein said third lens comprises a compound lens including a biconvex lens and biconcave lens.

13. The assembly of claim 1, wherein said fourth lens comprises a spherical planar concave lens.

14. The assembly of claim 1, further comprising a system stop between said fourth and fifth lenses.

15. The assembly of claim 1, wherein said fifth lens comprises a compound lens including first and second planar concave lenses.

16. The assembly of claim 1, wherein said sixth lens comprises a spherical planar convex lens.

17. A projection assembly, comprising:
   a lamp assembly;
   a light modulator panel with a diagonal dimension greater than about 25 mm coupled to said lamp assembly, wherein said light modulator panel selectively directs light to a projection lens assembly; and
   said projection lens assembly including first, second, third, fourth, fifth, and sixth lenses wherein said second, third, fifth, and sixth lenses form a double gauss lens assembly, and said first lens is configured to provide telecentricity; and
   a beam dump for absorbing light directed by said light modulator panel away from said lens assembly.

18. The assembly of claim 17, wherein said light modulator panel has a diagonal dimension of about 45.7 mm.

19. The assembly of claim 18, wherein said projection lens assembly covers a 46 mm diameter of said light modulator panel.

20. The assembly of claim 17, and further comprising an integrator device and an illumination relay at least partially between said lamp assembly and said light modulator panel.

21. The assembly of claim 17, wherein a first surface of said first lens is located at approximately 70 mm from said light modulator panel.

22. The assembly of claim 17, wherein said sixth lens is approximately 1000 mm from a display surface.

23. A projection assembly, comprising:
   a lamp assembly;
   a light modulator panel with a diagonal dimension greater than about 25 mm; and
   a projection lens assembly comprising a plurality of lenses forming a double gauss lens assembly optically coupled to said light modulator panel;
   wherein said light modulator panel comprises a reflective type light modulator panel that selectively reflects light into said projection lens assembly.

24. The assembly of claim 23, further comprising a beam dump for absorbing light reflected by said light modulator panel away from said lens assembly.

* * * * *